United States Patent
Stiegler et al.

(10) Patent No.: US 10,277,584 B2
(45) Date of Patent: Apr. 30, 2019

(54) VERIFICATION REQUEST

(71) Applicant: HEWLETT PACKARD ENTERPRISE DEVELOPMENT LP, Houston, TX (US)

(72) Inventors: Marc Douglas Stiegler, Palo Alto, CA (US); Gerald R Dolan, Melissa, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 141 days.

(21) Appl. No.: 15/116,610

(22) PCT Filed: Apr. 30, 2014

(86) PCT No.: PCT/US2014/036205
§ 371 (c)(1),
(2) Date: Aug. 4, 2016

(87) PCT Pub. No.: WO2015/167544
PCT Pub. Date: Nov. 5, 2015

(65) Prior Publication Data
US 2017/0214680 A1 Jul. 27, 2017

(51) Int. Cl.
H04L 29/06 (2006.01)
G06F 21/44 (2013.01)

(52) U.S. Cl.
CPC .......... H04L 63/083 (2013.01); G06F 21/44 (2013.01); G06F 21/445 (2013.01); H04L 63/06 (2013.01);
(Continued)

(58) Field of Classification Search
CPC ........ H04L 63/083; H04L 63/06; H04L 9/08; H04L 9/32; G06F 21/31
See application file for complete search history.

(56) References Cited

U.S. PATENT DOCUMENTS 6,360,254 B1 * 3/2002 Linden .............. G06F 17/30876
707/E17.112
7,599,936 B2 * 10/2009 Conway .............. G06F 17/3089
(Continued)

FOREIGN PATENT DOCUMENTS

WO   WO-2005/119606 A1   12/2005
WO   WO-2010/008123 A1   1/2010

OTHER PUBLICATIONS

Q. Feng, K. Tseng, J. Pan, P. Cheng and C. Chen, "New Anti-phishing Method with Two Types of Passwords in OpenID System," 2011 Fifth International Conference on Genetic and Evolutionary Computing, Xiamen, 2011, pp. 69-72. (Year: 2011).*
(Continued)

Primary Examiner — Kari L Schmidt
(74) Attorney, Agent, or Firm — Hewlett Packard Enterprise Patent Department

(57) ABSTRACT

An example method is provided in according with one implementation of the present disclosure. The method includes receiving a verification request from a unique web-key, determining whether the web-key is associated with an account, and receiving an electronic authentication associated with the web-key. The method further includes verifying the electronic authentication and the association between the web-key and the electronic authentication, and granting, with the computing device, the verification request.

17 Claims, 4 Drawing Sheets

(52) U.S. Cl.
CPC .......... *H04L 63/08* (2013.01); *H04L 63/1483* (2013.01); *G06F 2221/2119* (2013.01); *G06F 2221/2129* (2013.01)

(56) References Cited

U.S. PATENT DOCUMENTS

| | | | |
|---|---|---|---|
| 7,711,786 B2 | 5/2010 | Zhu et al. | |
| 8,261,193 B1* | 9/2012 | Alur | G06Q 10/101 |
| | | | 715/742 |
| 8,578,166 B2 | 11/2013 | De Monseignat et al. | |
| 2003/0061520 A1* | 3/2003 | Zellers | H04L 63/083 |
| | | | 726/5 |
| 2003/0097564 A1* | 5/2003 | Tewari | H04L 12/14 |
| | | | 713/171 |
| 2006/0149730 A1* | 7/2006 | Curtis | G06F 21/6272 |
| 2007/0101152 A1* | 5/2007 | Mercredi | G06F 21/34 |
| | | | 713/185 |
| 2009/0228966 A1* | 9/2009 | Parfene | G06F 21/31 |
| | | | 726/7 |
| 2010/0198871 A1* | 8/2010 | Stiegler | G06F 17/30168 |
| | | | 707/783 |
| 2010/0313248 A1 | 12/2010 | Krivosheev et al. | |
| 2011/0010470 A1 | 1/2011 | Hulbert et al. | |
| 2012/0297470 A1* | 11/2012 | Kwon | H04L 9/083 |
| | | | 726/7 |
| 2012/0303830 A1* | 11/2012 | Tobioka | G06F 21/31 |
| | | | 709/229 |
| 2013/0283362 A1 | 10/2013 | Kress et al. | |
| 2014/0053268 A1 | 2/2014 | Feng et al. | |
| 2014/0101434 A1* | 4/2014 | Senthurpandi | G06F 12/1408 |
| | | | 713/150 |
| 2015/0095995 A1* | 4/2015 | Bhalerao | H04L 63/0823 |
| | | | 726/6 |
| 2014/0041024 A1 | 2/2016 | Larkins | |

OTHER PUBLICATIONS

Czeskis, Alexei, et al. "Strengthening user authentication through opportunistic cryptographic identity assertions." Proceedings of the 2012 ACM conference on Computer and communications security. ACM, 2012, pp. 404-414. (Year: 2012).*
J. Bonneau, C. Herley, P. C. v. Oorschot and F. Stajano, "The Quest to Replace Passwords: A Framework for Comparative Evaluation of Web Authentication Schemes," 2012 IEEE Symposium on Security and Privacy, San Francisco, CA, 2012, pp. 553-567. (Year: 2012).*
International Search Report and Written Opinion, International Application No. PCT/US2014/036205, dated Jan. 19, 2015, pp. 1-9, KIPO.
Tyler Close, "Securing the Social Web by Moving Beyond Client-server Security," Nov. 11, 2010, pp. 1-6, QCon SF 2010.
Tyler Close, "Web-key: Mashing with Permission," Apr. 21-25, 2008, pp. 1-8, Beijing, China.

* cited by examiner

VERIFICATION REQUEST

BACKGROUND

Electronic fraud (i.e., use of electronic devices to defraud an individual or an organization) is an increasing problem for users of electronic devices in recent years. Various electronic fraud schemes (e.g., phishing, identity theft, spyware, viruses, etc.) use deception and other techniques to gain access to different personal information (e.g., user names, passwords, account information, social security information, and other confidential information).

DETAILED DESCRIPTION OF SPECIFIC EXAMPLES

Figure 1:
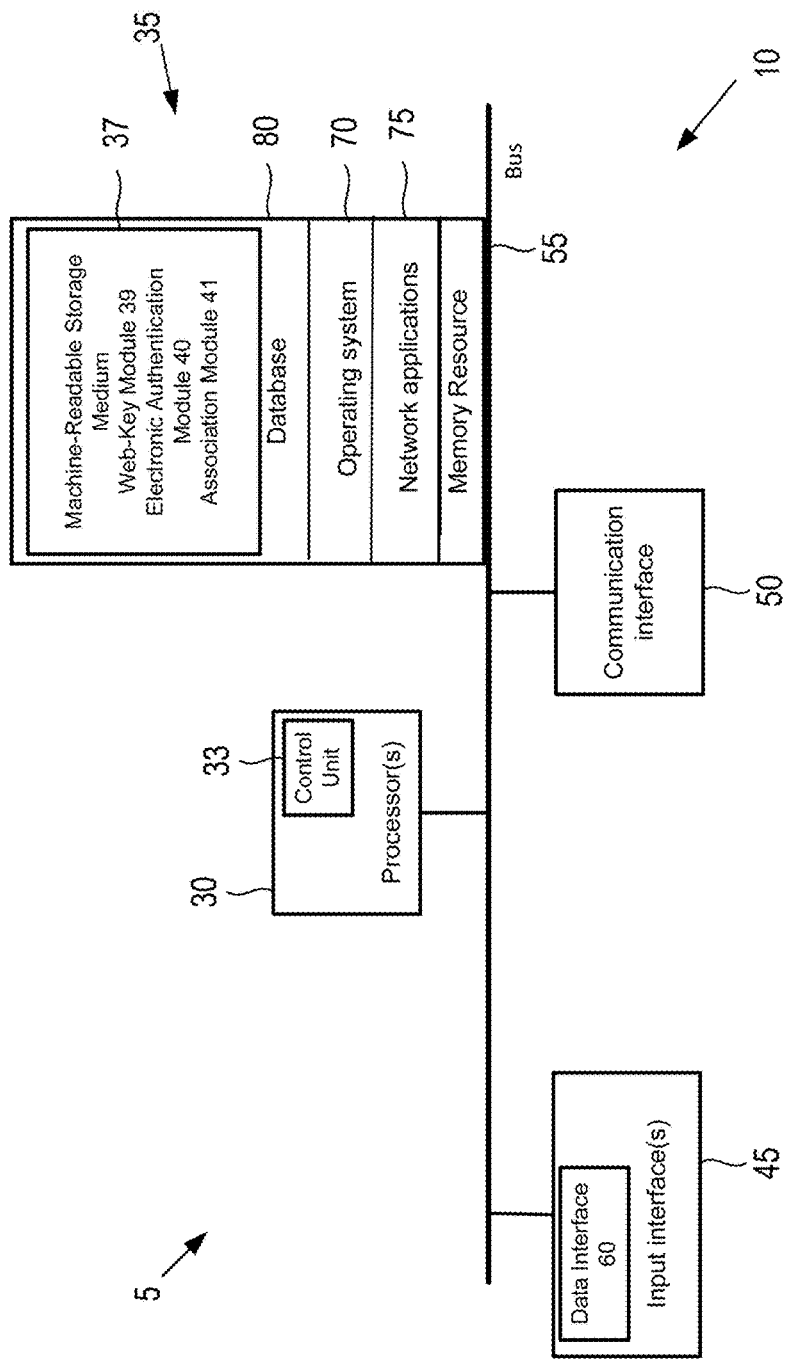
FIG. 1 is a schematic illustration of an example system for preventing phishing in accordance with an implementation of the present disclosure.

With the recent improvements in technology, electronic devices continue to play an increasing role in people's life. As used herein, the terms "electronic device" and "device" are to be used interchangeably and refer to any one of various smartphones, display screens, cellular telephones, tablets, personal data assistants (PDA's), laptops, computers, servers, and other similar electronic devices that include a processor.

Different users rely on different type of electronic devices for many day-to-day activities and work related tasks. The large number of users that utilize different type of electronic devices stimulates providers to offer devices that can meet the increase in user demand, support the broad array of available services, and provide reliable communication. Due to the proliferation of electronic devices, their technological capabilities and functions are continuously changing and increasing. Consequently, these devices also offer expanded services to their users. These electronic devices are used to access the Internet, communicate with other devices, access personal information, and perform other personal and business related functions.

Because of the increased popularity of electronic devices and their integration into many day-to-day operations, electronic fraud via cyber-attacks is an increasing issue. Electronic fraud costs individuals and organization billions of dollars every year. Phishing is the most pernicious type of cyber-attack in the world today. Phishing refers to the act of sending an electronic message (email, SMS, etc.) to a user of an electronic device falsely claiming to be from a legitimate enterprise in an attempt to scam the user into urgently enter/update their personal data. That way, a user may provide personal information (e.g., user name, password, account information, social security information, etc.) that may be used for identity theft or for other fraudulent activities.

In recent years, phishing attacks are becoming more advanced in their exploitation of social engineering techniques. According to available electronic fraud data, nearly every incident of online espionage in 2012 involved some sort of phishing attack and 75% of all cyber-attacks against enterprises include a successful phishing attack. Therefore, there is a significant issue with systems and methods for user verification, identification, and prevention of phishing attacks in the context of electronic communication.

One problem with detecting and/or preventing phishing attacks is, that a combination of 1) a username/password created by the user and 2) an electronic authentication (e.g., a token) generated by a device in the user's possession does not usually work as intended to prevent phishing. A traditional phishing attack may easily capture both authentication sources (i.e., the password and the token) that can then be used by the attacker to compromise the user's account. Since the credentials (i.e., the authentication information) used to authenticate a user are generally disconnected from the source (e.g., the website where they are to be entered), a phishing attacker may split these credentials from the user (via the phishing attack) and utilize them at the appropriate source.

The present description is directed to methods, systems, and computer readable media for preventing phishing attacks. Specifically, the present description proposes an approach for augmenting an electronic authentication (e.g., a token) available to a user with a unique web-key (e.g., an unguessable private uniform resource locator (URL)) for a user's account to mitigate the vulnerability of a verification/login processes to phishing attacks.

In one example, a user may receive a unique web-key that includes a URL with an unguessable string of characters, where the web-key is associated with the user's account at source/vendor (e.g., a bank, bank's website, etc.) that is to be accessed by the user. The web-key is unique to each user account and consequently may not be duplicated by a phishing attacker unless the attacker somehow obtains the unique web-key from the user. Further, the user may use an electronic device (e.g., a token generator, a phone, etc.) to generate an electronic authentication (e.g., a token, an SMS, etc.) as an additional level of authentication for a verification/login request.

To access the source, a user may provide a verification/login request by clicking on the web-key, which directs the user to a personalized private login page. Then, the user may present/enter the electronic authentication at the personalized login page. The combination of the authenticity of the unique web-key and the generated electronic authentication (i.e., token), combined with the association between the web-key and the electronic authentication and the association between the web-key and an account at the source, allows the source to grant the verification/login request of the user.

The proposed approach prevents phishing attacks and does not simply detect them. A phishing attack may lure a user into revealing the electronic authentication, but this electronic authentication may not be used by the attacker without the web-key. Because the web-key is unique to each user or account (i.e., it is unguessable), and because the unguessable credential is tightly bound to the URL so that the user cannot be tricked into presenting it at the wrong site, it can never be captured by a phishing attack. Thus, the web-key mitigates the risk of the token vulnerability to phishing. Further, a stolen/copied web-key on its own cannot be used without the associated token, thereby mitigating the risk of a stolen/coped web-key. In addition, a user may also be required to enter a user name and/or a password when connecting to the source via the web-key. The password is associated with the web-key and with the electronic authentication (at the time the password is created). Having a password, adds an additional authentication level for the verification/login request of the specific source.

In one example implementation, a verification or login request may be received from a unique web-key at a computing device. The computing device may determine whether the web-key is associated with an account (e.g., an account related to the source desired to be accessed). Further, an electronic authentication (e.g., token, SMS, etc.) associated with the web-key may be also received at the computing device. The computing device may verify the electronic authentication (i.e., the authenticity of the token) and the association between the web-key and the electronic authentication in order to grant the verification request.

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

FIG. 1 is a schematic illustration of an example system 5 for preventing phishing in accordance with one implementation of the present disclosure. The illustrated system 5 is capable of carrying out the techniques described below. The system 5 may be operated by a source (e.g., bank's website, etc.) that a user is trying to connect/login to or by a third party providing a support to the source. In one example, the system 5 includes at least one computing device 10. It is to be understood that the techniques described in relation to the device 10 may be implemented with any other computing device. The computing device 10 can be a laptop, a personal computer, a tablet, an all in one computing device, a gaming console, a server, a smartphone, a music player, a visual player, a personal digital assistant (PDA), a cellular telephone, an electronic notepad, a plurality of distributed computing devices, or any other suitable computing device that includes a processor. In the illustrated example, the computing device 10 may include at least one processing device 30 (also called a processor), a memory resource 35, input interface(s) 45, and a communication interface 50.

In other examples, the computing device 10 includes additional, fewer, or different components for carrying out the functionality described herein. It is to be understood that the operations described as being performed by the computing device 10 that are related to this description may, in some implementations, be performed or distributed between the computing device 10 and other electronic/computing devices (not shown).

As explained in additional details below, the computing device 10 may include software, hardware, or a suitable combination thereof configured to enable functionality of the computing device 10 and to allow it to carry out the techniques described below and to interact with the one or more systems or devices. The computing device 10 may include communication interfaces (e.g., a Wi-Fi® interface, a Bluetooth® interface, a 3G interface, a 4G interface, a near field communication (NFC) interface, etc.) that are used to connect with other devices/systems and/or to a network (not shown). The network may include any suitable type or configuration of network to allow for communication between the computing device 10 and any other devices/systems (e.g., other electronic devices, computing devices, displays, etc.).

The processing device 30 of the computing device 10 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device), the memory resource 35, the input interfaces 45, and the communication interface 50 may be operatively coupled to a bus 55.

The communication interface 50 may allow the computing device 10 to communicate with plurality of networks, communication links, and external devices. The input interfaces 45 can receive information from devices/systems in communication with the computing device 10. In one example, the input interfaces 45 include at least a data interface 60 that may receive data from any external device or system.

The processor 30 includes a controller 33 (also called a control unit) and may be implemented using any suitable type of processing system where at least one processor executes computer-readable instructions stored in the memory 35. The processor 30 may independently control a display. The processor 30 may receive input from an input device (not shown) or any other computing device/system in communication with the device 10.

The memory resource 35 includes any suitable type, number, and configuration of volatile or non-transitory machine-readable storage media 37 to store instructions and data. Examples of machine-readable storage media 37 in the memory 35 include read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, an SD card, and other suitable magnetic, optical, physical, or electronic memory devices. The memory resource 35 may also be used for storing temporary variables or other intermediate information during execution of instructions to by the processor 30.

The memory 35 may also store an operating system 70 and network applications 75. The operating system 70 can be multi-user, multiprocessing, multitasking, multithreading, and real-time. The operating system 70 can also perform basic tasks such as recognizing input from input devices; sending output to output devices; keeping track of files and directories on memory 35; controlling peripheral devices, such as printers, image capture device; and managing traffic on the bus 55. The network applications 75 include various components for establishing and maintaining network connections, such as computer-readable instructions for implementing communication protocols.

The memory 35 may include at least one database 80. In other example implementations, the device 10 may access external database (not shown) that may be stored remotely of the computing device 10 (e.g., can be accessed via a network or a cloud). The database 80 may store various information related to user accounts for the source to be accessed/logged into and the associations between an account, a web-key, an electronic authentication, a password, etc.

Software stored on the non-transitory machine-readable storage media 37 and executed by the processor 30 includes, for example, firmware, applications, program data, filters, rules, program modules, and other executable instructions. The control unit 33 retrieves from the machine-readable storage media 37 and executes, among other things, instructions related to the control processes and methods described herein. In one example, the instructions stored in the non-transitory machine-readable storage media 37 implement web-key module 39, an electronic authentication module 40, and an association module 41. In other examples, the instructions can implement more or fewer modules (e.g., various other modules related to the operation of the device 10). In one example, modules 39-41 may be implemented with electronic circuitry used to carry out the functionality described below. As mentioned above, in addition or as an alternative, modules 39-41 may be implemented as a series of instructions encoded on a machine-readable storage medium and executable by a processor.

As explained in additional detail below, the web-key module 39 may generate at least one unique web-key (i.e., an unguessable key) associated with a user account (e.g., an account related to the source to be accessed). In other words, the module 39 may generate a unique web-key for every account that is created at the source (e.g., a bank). The unique web-key may be generated at the computing device 10, at another computing device in communication with the device 10, or at a plurality of computing devices. The web-key may then be sent to the user creating the account (e.g., via email, SMS, etc.) and may be stored (e.g., as a bookmark, in a flash drive, email, etc.) to be used for verification/login purposes. In one example, the web-key is an unguessable private URL that is generated for each account/user that may access the source. One example of a unique web-key or URL is: https://securesite.com/#s=hmfi5qb5kwh4ir.

In that example, the first portion of the web-key, "https://securesite.com," may represent the web portal of the source that is to be accessed by the user. The second portion of the web-key, "hmfi5qb5kwh4ir," may comprise an unguessable of characters in the URL that make the web-key user/account specific. An unguessable string of characters is generated for each web-key such that all web-keys are unique and cannot be guessed or otherwise identified by a phishing attacker. The web-key may link the user to the user's personal login on the source/vendor site and not to a general verification/login site, which is the case with the standard account login process.

In other words, the web-key may act as a private login page, reachable only by the URL that is generated by the source. That private login page may be shown on any type of display of a device operated by the user. The only way that an attacker can get to the unique login page of the URL is by having the actual link/URL available. Thus, the web-key is invulnerable to phishing attacks.

The electronic authentication module 40 communicates with an electronic device (e.g., a security token generator, a phone, etc.) that generates an electronic authentication (e.g., a token) that is associated with the web-key. In one example, the electronic authentication may be an authentication sequence (e.g., of characters, numbers, symbols, etc.) generated by the electronic device. In one implementation, the electronic device that generates an electronic authentication may be provided to the user who created a new account at the source. Further, that electronic device may be linked to the specific web-key generated for that user. In some examples, the electronic authentication module 40 may create the association between the web-key and the electronic authentication (e.g., by linking each unique web-key with a specific electronic device that generates an electronic authentication). In another example, that can be done by the association module 41.

The association module 41 may associate a unique web-key with an account related to the source (e.g., when the account is initially created by the user and the web-key is generated). Also, the module 41 may associate an electronic authentication generating device with the web-key. In other words, an electronic authentication generated by the electronic authentication generating device may be associated with the web-key. Further, when a password is used, the module 41 may associate the password with the web-key and with the electronic authentication (e.g., when the account is initially created by the user and the password, the web-key, and the authentication generating device are setup). In one example, the association between these elements is performed by linking or correlating (e.g., with the processor 30) the above-identified elements and saving the linking/associated data in memory (e.g., in the database 80). The association module 41 may also verify the associations between these elements when a verification or login request is received from a user. It is to be understood that in alternative implementations, some of the functions performed by the association module 41 may be performed by the web-key module 39 and/or the electronic authentication module 40.

As explained in additional details below, modules 39-41 may analyze a login request (e.g., to access a source) received from a unique URL (i.e., a web-key) to determine whether the unique URL is associated with a specific account. Modules 39-41 may also analyze an electronic token to determine whether the electronic token is associated with the unique URL, and analyze a password to determine whether the password is associated with unique URL and the token. Modules 39-41 may grant the login request when the unique URL is associated with the specific account, the electronic token is associated with the unique URL, and the password is associated with unique URL and the token.

Figure 2:
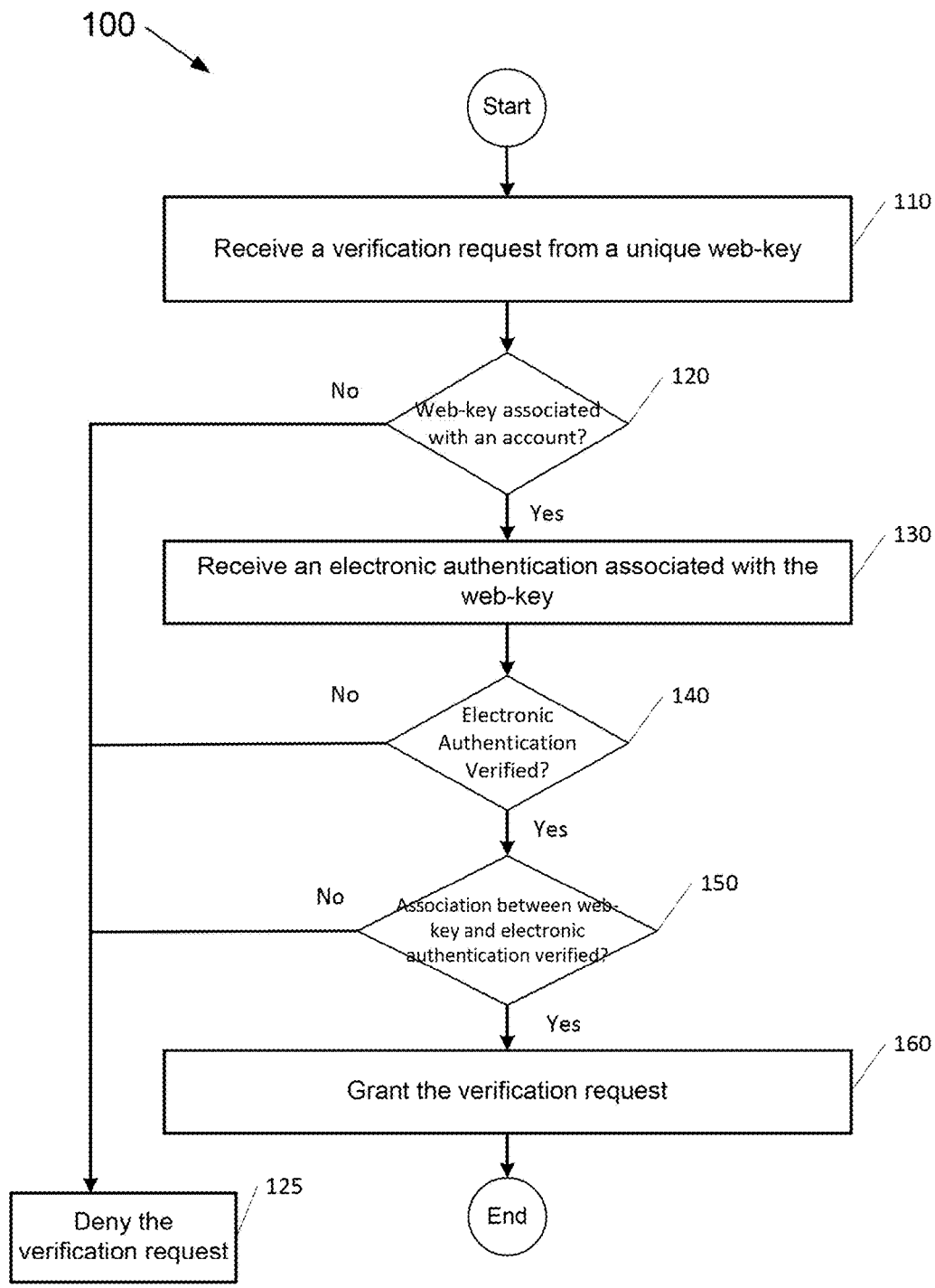
FIG. 2 illustrates a flow chart showing an example of a method for preventing phishing in accordance with an implementation of the present disclosure.

FIG. 2 illustrates a flow chart showing an example of a method 100 for preventing phishing. The method implements a verification request received from a user that has an account with a source (e.g., a bank) that he or she is trying to access. In one example, the method 100 can be executed by the control unit 33 of the processor 30 of the computing device 10. Various elements or blocks described herein with respect to the method 100 are capable of being executed simultaneously, in parallel, or in an order that differs from the illustrated serial manner of execution. The method 100 is also capable of being executed using additional or fewer elements than are shown in the illustrated examples.

The method 100 may be executed in the form of instructions encoded on a non-transitory machine-readable storage medium 37 executable by the processor 30 of the computing device 10. In one example, the instructions for the method 100 implement the web-key module 39, the electronic authentication module 40, and the association module 41. In other examples, the execution of the method 100 may be distributed between the processing device 30 and other processing devices in communication with the processing device 30. In yet another example, the method 100 may be executed on another computing device connected to the computing device 10 or on several computing devices.

The method 100 begins at block 110, where the processor 30 receives a verification request from a unique web-key (e.g., from a personal login page reached via a unique web-key). The verification request may be a login request to an account or any other similar action. As noted above, the unique web-key may be an unguessable URL that is available only to the user associated with an account at the source. In one example, the user may click on the web-key to be taken to a private login page, reachable only by the unique URL.

Next, the control unit 33 determines whether the web-key is associated with an account at the source (at 120). This may be performed by one of modules 39-41. For example, the control unit 33 may access a database that includes linking/association information for various accounts and web-keys to determine whether the received web-key matches an account. If the control unit 33 determines that the web-key is not associated with an account (e.g., it is a fake web-key generated by an attacker), the control unit denies the verification request (at 125). If, on the other hand, the control unit determines that the web-key is associated with an account, the control unit moves to block 130 to receive an electronic authentication associated with the web-key. As noted above, the electronic authentication is received from an electronic device in communication with the computing device.

Presenting an electronic authentication is required to mitigate the risk of theft of the web-key. In other words, even if somehow an attacker is able to obtain the web-key (which is very unlikely), he or she still needs to combine the web-key with an electronic authentication (e.g., a token) in order to complete the verification request and to be granted access. When the existing web-key is compromised, the control unit 33 may provide a new web-key associated with a specific account. For example, a user may click on a link that allows him or her to request a new web-key. Following such a request, the control unit may generate a new web-key for the user. In addition, the user may request replacing the electronic token generation device.

At 140, the control unit 33 verifies the electronic authentication (i.e., the authenticity of the received token); and at 150 the control unit 33 verifies the association between the web-key and the electronic authentication. This may be performed with the association module 41. In other words, the control unit 33 first confirms that the presented token is authentic or valid (e.g., by using available token technology), and then the control unit 33 determines whether the presented token is associated with a web-key (e.g., by searching a database that includes linking/association information for web-keys and token generating devices). Because the token generating device for a user was initially linked to the web-key generated for that user, the control unit 33 may identify the association between the token generated by the device and the web-key.

If the control unit does not verify the information in one of blocks 140 or 150, the control unit 33 denies the verification request (at 125). When both, the electronic authentication and the association between the web-key and the electronic authentication are verified, the control unit 33 grants the verification request of the user (at 160). In other words, the user may connect to the site of the source (e.g., a bank) where he or she may navigate through their personal account.

In an alternative implementation, the control unit 33 may also receive a password (e.g., key, PIN, etc.) from a user (e.g., via the web-key URL) that is associated with the web-key and with the electronic authentication. As noted above, when a user account with at source is initially created, a password inputted by the user, the web-key, and the authentication generating device may be linked or correlated and that information may be stored in a database. In that implementation, the control unit 33 may verify a password entered by the user on their private webpage (e.g., by comparing the received/entered password to a password stored in a memory and confirming associations between the other elements). Including a password in the verification request adds an additional authentication level to the user's account.

Therefore, the control unit 33 may deny the verification request when at least one of the following occurs: 1) the password entered by the user or the electronic authentication (verified at block 140) is not verified; 2) the association between the web-key and the electronic authentication is not verified; and 3) the web-key is not associated with an account.

Figure 3:
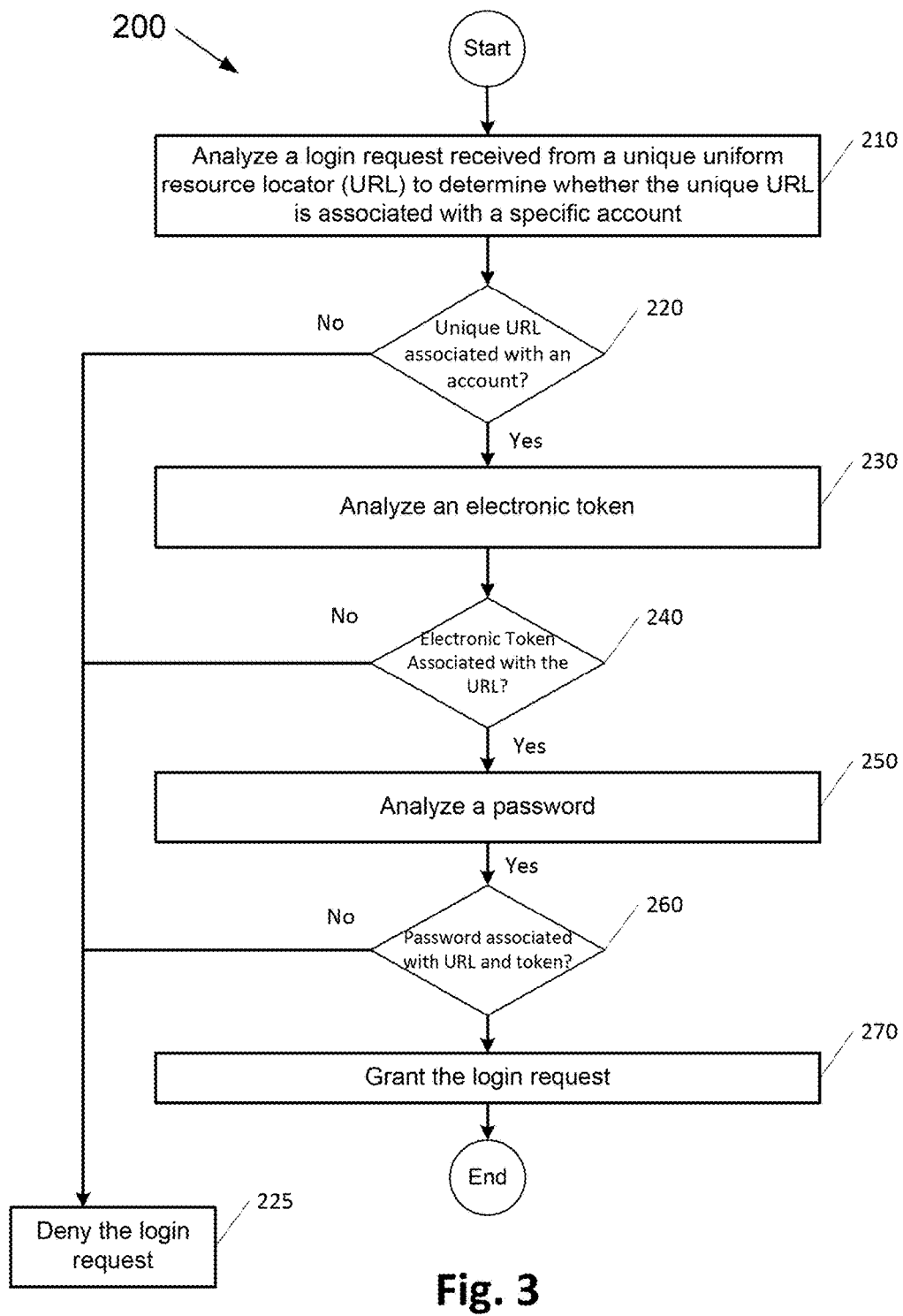
FIG. 3 illustrates a flow chart showing an example of an alternative method for preventing phishing in accordance with an implementation of the present disclosure.

FIG. 3 illustrates a flow chart showing an example of an alternative method 200 for preventing phishing. The method implements a login request received from a user that has an account with a source (e.g., a bank) that he or she is trying to access. The method 200 may be executed with the web-key module 39, the electronic authentication module 40, and the association module 41, where these modules are implemented with electronic circuitry used to carry out the functionality described below. Various elements or blocks described herein with respect to the method 200 are capable of being executed simultaneously, in parallel, or in an order that differs from the illustrated serial manner of execution. It is to be understood that the method 200 may be implemented by the computing device 10 of the system 5 or by any other computing device.

The method 200 begins at 210, where the computing device 10 analyzes a login request received from a unique URL (i.e., a web-key) to determine whether the unique URL is associated with a specific account at the source (at 220). In other words, the login request is received from a private login page of a user reached via the web-key. The unique URL includes an unguessable sequence of identifiers In other words, using the unique URL provided by the source, a user may initiate a login request to access the specific account at the source. Blocks 210-220 may be similar to blocks 110-120 of the method 100, where the device 10 receives a verification request and determines whether the web-key, from which the request is received, is associated with an account at the source. When it is determined that the unique URL is not associated with a specific account, the device 10 denies the login request (at 225)

At 230, the computing device 10 analyzes an electronic token to determine whether the electronic token is associated with the unique URL (at 240). These blocks may be similar to blocks 130-150 of the method 100, where the device 10 receives a token from an electronic device, verifies the electronic token (i.e., the authenticity of the received token); and verifies the association between the unique URL and the electronic token. If the device 10 does not verify the authenticity of the token or the association between token and the unique URL, the device 10 denies the login request (at 225).

At 250, the computing device analyzes a password (e.g., received from the user via the unique URL) to determine whether the password is associated with unique URL and the token (at 260). In one example, the device 10 may verify a password entered by the user via the URL (e.g., by comparing the received/entered password to a stored password). The device 10 may also confirm the associations between the password, the unique URL and the token (i.e., when an account at the source is created, a user password, the account, the unique URL, and the device generating a token may be linked or correlated and that information may be stored in memory).

At 270, the computing device may grant the login request when the unique URL is associated with the specific account, the electronic token is associated with the unique URL, and the password is associated with unique URL and the token. Therefore, the computing device 10 may reject the login request when at least one of the associations between: 1) the unique URL and the specific account; 2) the electronic token and the unique URL; and 3) the password, the unique URL and the token is not verified.

Figure 4:
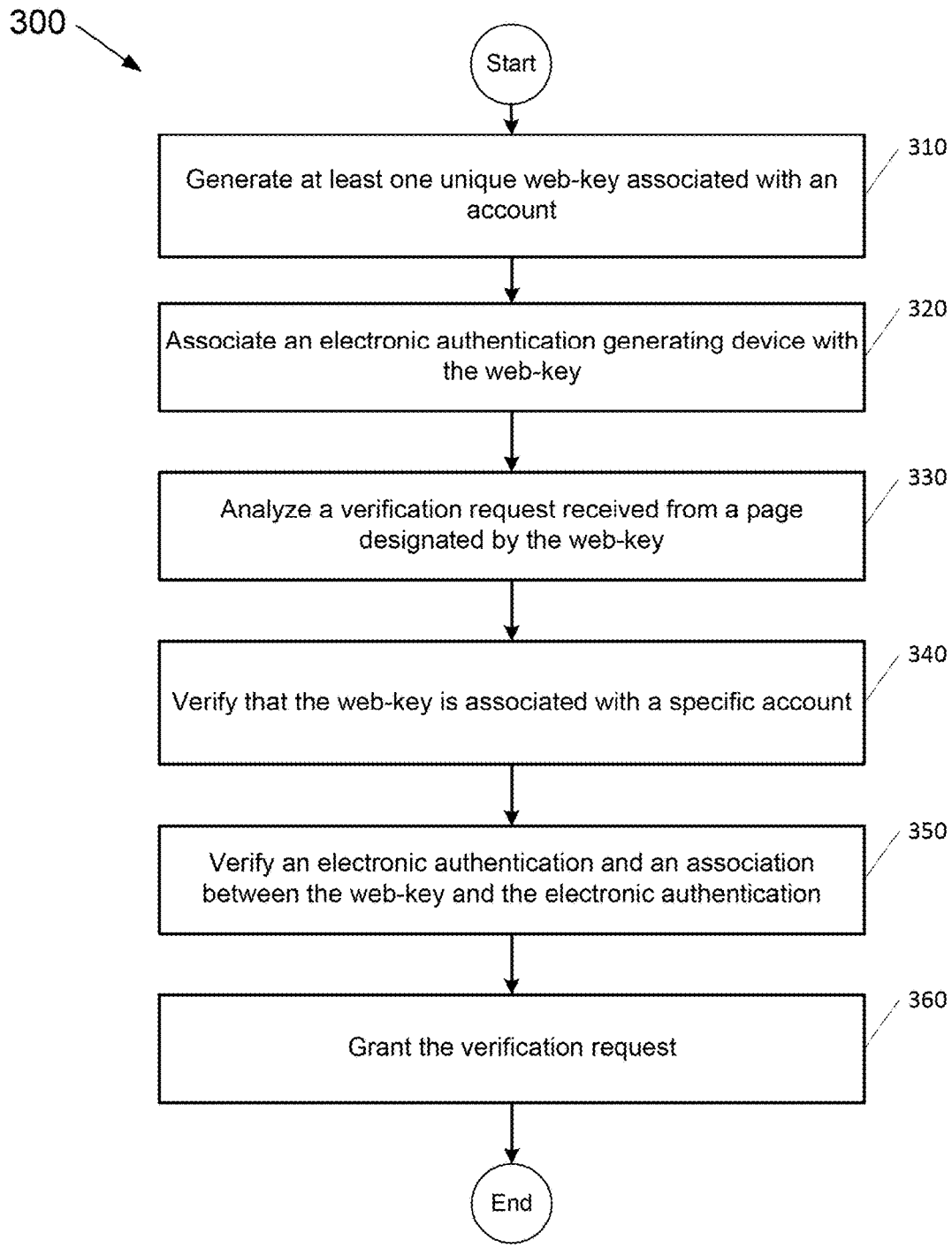
FIG. 4 illustrates a flow chart showing an example of yet another alternative method for preventing phishing in accordance with an implementation of the present disclosure.

FIG. 4 illustrates a flow chart showing an example of yet another alternative method 300 for preventing phishing. The method 300 may be executed in the form of instructions encoded on a non-transitory machine-readable storage medium 37 executable by the processor 30 of the computing device 10. The method 300 may be executed with the web-key module 39, the electronic authentication module 40, and the association module 41.

The method 300 begins at block 310, where the processor 30 (or the processor of another computing device) generates at least one unique web-key associated with an account. This may be performed by the web-key module 39. The control unit 33 may generate a unique web-key for every account that is created at the source (e.g., a bank). The web-key may then be sent to the user creating the account (e.g., via email, SMS, etc.) and may be stored (e.g., as a bookmark, in a flash drive, email, etc.) to be used for verification/login purposes. In one example, the web-key includes a URL that comprises an unguessable sequence of identifiers. The web-key is a private login page, reachable only by the URL that links the user directly to the user's account at the source.

At 320, the control unit 33 associates an electronic authentication generating device with the web-key. This may be performed by the electronic authentication module 40. For example, after a user account is created the user receives electronic authentication generating device from the source. That device may be linked to the specific web-key generated for that user. The control unit may link each web-key with an electronic device that generates an electronic authentication to create an association between the web-key, the device and the electronic authentication generated by that device.

At 320, the control unit analyzes a verification request received from a page designated by the web-key (i.e., received from the private login page reached via the web-key) to verify that the web-key is associated with a specific account (at 330). Blocks 320-330 may be similar to blocks 110-120 of the method 100, where the control unit 33 receives a verification request and determines whether the web-key, from which the request is received, is associated with an account at the source.

Next, the control unit verifies an electronic authentication and an association between the web-key and the electronic authentication (at 350). Block 350 may be similar to blocks 130-150 of the method 100, where the control unit receives an electronic authentication from an electronic device, verifies the electronic authentication (i.e., the authenticity of the received token); and verifies the association between the web-key and the electronic authentication. If all the steps are verified, the control unit grants the verification request (at 360).

In addition, to the blocks described in FIG. 4, the control unit 33 may also receive a password from a user (e.g., via the web-key), where the password is associated with the web-key and with the electronic authentication. The control unit 33 may verify a password entered by the user (e.g., by comparing the entered password to a password stored in a memory and confirming associations between the password the other elements). The control unit 33 may deny the verification request when at least one of the following occurs: 1) the password entered by the user or the electronic authentication is not verified; 2) the association between the web-key and the electronic authentication is not verified; and 3) the web-key is not associated with a specific account.

What is claimed is:

1. A method comprising:
   receiving, at a computing device from a client device over a network, a verification request via a unique web-key of the computing device on the network and accessed by the client device, the unique web-key comprising a uniform resource locator (URL);
   determining, with the computing device, whether the web-key is account-associated;
   in response to determining that the web-key is account-associated with a specific account, sending, by the computing device to the client device over the network, a private login page unique to the specific account and requesting an electronic authentication, the electronic authentication including an electronic token and a password;
   after sending the private login page, responsively receiving, at the computing device from the client device over the network, the requested electronic authentication;
   verifying, with the computing device, that the password is associated with the token, and that the password and the token are associated with the unique web-key in that an account of the electronic authentication is the specific account with which the web-key is associated; and
   granting, with the computing device, the verification request and permitting the client device access to the computing device when the unique web-key is associated with the specific account, the password is associated with the token, and the electronic authentication is associated with the unique web-key,
   wherein the method reduces a risk of phishing attacks nefariously soliciting the electronic authentication by rendering the electronic authentication unusable without the web-key.

2. The method of claim 1, wherein the URL comprises an unguessable string of characters.

3. The method of claim 1, further comprising denying the verification request when at least one of the following occurs:
   the password or the electronic authentication is not verified,
   the association between the web-key and the electronic authentication is not verified, and
   the web-key is not associated with an account.

4. The method of claim 1, further comprises providing a new web-key associated with a specific account when an existing web-key is compromised.

5. The method of claim 1, further comprising:
   receiving, at the computing device from a second client device over the network, a second verification request via a second unique web-key of the computing device on the network and accessed by the second client device, the second unique web-key comprising a second URL;

determining, with the computing device, whether the second unique web-key is account-associated;

in response to determining that the second unique web-key is not account-associated, denying, by the computing device, the second verification request.

6. The method of claim 1, wherein the token comprises an account name or a user name.

7. A system comprising:

at least one computing device having at least one processing device with a control unit to:

analyze a login request received from a client device over a network via a unique uniform resource locator (URL) of the at least one computing device on the network and accessed by the client device to determine whether the unique URL is account-associated;

in response to determining that the unique URL is associated with a specific account, send to the client device over the network a private login request unique to the account and requesting an electronic token and a password;

after sending the private login request, responsively receive the electronic token and the password from the client device over the network;

analyze the password to determine whether the password is associated with the token;

analyze the password and the token to determine whether the electronic token and the password are associated with the unique URL, in that an account of the electronic token and the password is the specific account with which the unique URL is associated; and grant the login request when the unique URL is associated with the specific account, the password is associated with the token, and the electronic token and the password are associated with the unique URL, wherein a risk of phishing attacks nefariously soliciting the electronic token or the password is reduced by the electronic token and the password being rendered unusable without the unique URL.

8. The system of claim 7, wherein the unique URL includes an unguessable sequence of identifiers.

9. The system of claim 7, wherein the electronic token is received from the client device in communication with the computing device, wherein the client device is associated with the specific account and the unique URL.

10. The system of claim 7, wherein the control unit is further to reject the login request when at least one of the associations between: a) the unique URL and the specific account, b) the electronic token and the unique URL, and 3) the password, the unique URL and the token is not verified.

11. The system of claim 7, wherein the token comprises an account name or a user name.

12. A non-transitory machine-readable storage medium encoded with instructions executable by at least one processor of at least computing device, the machine-readable storage medium comprising instructions to:

generate a unique web-key associated with an account;

associate an electronic authentication generating device with the web-key;

analyze a verification request received from a page designated by the web-key and accessible at a uniform resource locator (URL);

verify that the web-key is account-associated;

in response to verifying that the web-key is account-associated with a specific account, receive an electronic authentication, the electronic authentication including an electronic token and a password;

upon receiving the electronic authentication, verify that the password is associated with the token, and that the password and the token are associated with the unique web-key in that an account of the electronic authentication is the specific account with which the web-key is associated; and grant the verification request and permitting the client device access to the computing device when the unique web-key is associated with the specific account, the password is associated with the token, and the electronic authentication is associated with the unique web-key, wherein a risk of phishing attacks nefariously soliciting the electronic authentication is reduced by the electronic token and the password being rendered unusable without the page designed by the web-key.

13. The non-transitory machine-readable storage medium of claim 12, wherein the URL comprises an unguessable sequence of identifiers.

14. The non-transitory machine-readable storage medium of claim 12, wherein the electronic authentication includes an electronic token received from electronic authentication generating device in communication with the computing device.

15. The non-transitory machine-readable storage medium of claim 12, further comprising instructions to:

analyze a password associated with the web-key and the electronic authentication; and verify the password.

16. The non-transitory machine-readable storage medium of claim 15, further comprising instructions to reject the verification request when:

the password or the electronic authentication is not verified, the association between the web-key and the electronic authentication is not verified, and the web-key is not associated with a specific account.

17. The non-transitory machine-readable storage medium of claim 12, wherein the token comprises an account name or a user name.

* * * * *